(12) United States Patent
Ali

(10) Patent No.: US 10,038,781 B2
(45) Date of Patent: Jul. 31, 2018

(54) SYSTEM AND METHOD FOR ANALYZING TERMINAL LOCATION DURING CALL REQUEST

(71) Applicant: AT&T Intellectual Property I, LP, Atlanta, GA (US)

(72) Inventor: Liaqat Ali, Danville, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 272 days.

(21) Appl. No.: 14/060,038

(22) Filed: Oct. 22, 2013

(65) Prior Publication Data

US 2015/0111548 A1    Apr. 23, 2015

(51) Int. Cl.
*H04M 3/42* (2006.01)
*H04W 4/16* (2009.01)

(52) U.S. Cl.
CPC ......... *H04M 3/42042* (2013.01); *H04W 4/16* (2013.01); *H04M 2242/30* (2013.01)

(58) Field of Classification Search
CPC ......... H04M 3/42042; H04M 2242/30; H04W 4/16
See application file for complete search history.

(56) References Cited

U.S. PATENT DOCUMENTS

| | | | | |
|---|---|---|---|---|
| 6,477,374 | B1 * | 11/2002 | Shaffer | H04M 7/006 379/211.02 |
| 7,177,651 | B1 * | 2/2007 | Almassy | G01S 5/0072 340/994 |
| 7,269,413 | B2 | 9/2007 | Kraft | |
| 7,280,647 | B2 | 10/2007 | Henderson | |
| 8,060,068 | B1 * | 11/2011 | Mangal | H04M 3/42042 455/415 |
| 8,090,389 | B2 | 1/2012 | Tysowski | |
| 8,117,341 | B2 | 2/2012 | Matz | |
| 8,301,174 | B2 | 10/2012 | An | |
| 8,385,884 | B1 * | 2/2013 | Hertzfeld | H04M 3/436 455/411 |
| 8,396,514 | B2 | 3/2013 | Adams | |
| 8,584,188 | B2 * | 11/2013 | Gupta | H04N 5/44513 725/106 |

(Continued)

OTHER PUBLICATIONS

Kamal, Nayan, "Contactive: More than Just a Free Caller ID", TechToll.in, Aug. 23, 2013, 6 pages.

*Primary Examiner* — Mehmood B. Khan
(74) *Attorney, Agent, or Firm* — Guntin & Gust, PLC; Joseph Hrutka

(57) ABSTRACT

A system that incorporates the subject disclosure may include, for example, receiving a new call request in response to equipment of a calling party placing a call from a calling-party location to equipment of a called party, wherein the new call request includes an identity of the equipment of the calling party. An identity of the calling-party is determined based on an association between the identity and the equipment of the calling party. A location of the equipment of the calling party is determined and a location indicator is generated based on the identity of the calling-party and the location of the equipment of the calling party. The location indicator is presented to a display of the equipment of the called party. Other embodiments are disclosed.

17 Claims, 7 Drawing Sheets

(56) References Cited

U.S. PATENT DOCUMENTS

| | | | | |
|---|---|---|---|---|
| 8,880,047 B2* | 11/2014 | Konicek | ........... | H04M 1/72513 |
| | | | | 455/417 |
| 8,984,059 B2* | 3/2015 | Johnson | ................. | H04W 4/14 |
| | | | | 709/203 |
| 9,451,081 B2* | 9/2016 | Fan | ......................... | H04L 67/18 |
| 2003/0016804 A1* | 1/2003 | Sheha | .................... | G01C 21/26 |
| | | | | 379/201.06 |
| 2004/0170265 A1* | 9/2004 | Benco | .................... | H04M 3/56 |
| | | | | 379/202.01 |
| 2006/0035647 A1 | 2/2006 | Eisner et al. | | |
| 2008/0298564 A1* | 12/2008 | Rondeau | ........... | H04M 3/53366 |
| | | | | 379/88.26 |
| 2009/0186629 A1* | 7/2009 | Soelberg | ............... | H04M 1/575 |
| | | | | 455/456.1 |
| 2009/0214013 A1* | 8/2009 | Cassanova | ........ | H04L 29/12896 |
| | | | | 379/142.04 |
| 2010/0184486 A1* | 7/2010 | Gupta | ............... | H04M 3/42042 |
| | | | | 455/567 |
| 2011/0129077 A1 | 6/2011 | Prakash et al. | | |
| 2011/0244840 A1* | 10/2011 | Tang | ................. | H04M 3/42042 |
| | | | | 455/415 |
| 2011/0255677 A1* | 10/2011 | Kasad | .................. | H04M 1/575 |
| | | | | 379/142.1 |
| 2012/0196581 A1 | 8/2012 | Papakipos et al. | | |
| 2013/0210399 A1* | 8/2013 | Cloutier | ............ | H04M 3/42042 |
| | | | | 455/415 |
| 2014/0274006 A1* | 9/2014 | Mutya | .................. | H04W 36/14 |
| | | | | 455/416 |
| 2016/0021246 A1* | 1/2016 | Forbes | ................. | H04W 76/10 |
| | | | | 370/259 |
| 2016/0224210 A1* | 8/2016 | Moore | ................. | H04N 21/435 |
| 2017/0070609 A1* | 3/2017 | Prakash | ................. | H04L 51/32 |

* cited by examiner

300

SYSTEM AND METHOD FOR ANALYZING TERMINAL LOCATION DURING CALL REQUEST

FIELD OF THE DISCLOSURE

The subject disclosure relates to a system and method for analyzing terminal location during call request.

BACKGROUND

Internet protocol (IP) television systems currently offer voice over IP, or VoIP, and video conferencing capabilities using computer equipment and specialized VoIP telephones. Subscribers of such services can make and answer phone calls using existing corded or cordless phones that may be coupled, e.g., by a phone jack, to a terminal adapter located inside a residential gateway. Other voice services utilize a set-top box executing a soft-phone client for processing audio and/or video calls, allowing calls to be announced, answered and recorded directly through a subscriber's multimedia system. For example, a subscriber receiving a call during the presentation of a media program, would receive on their TV display an incoming call indicator that can include caller identification, such as a phone number or name of a calling party. Other indicators include voice mail message or message waiting notifications.

BRIEF DESCRIPTION OF THE DRAWINGS

Reference will now be made to the accompanying drawings, which are not necessarily drawn to scale, and wherein.

DETAILED DESCRIPTION

Figure 1:
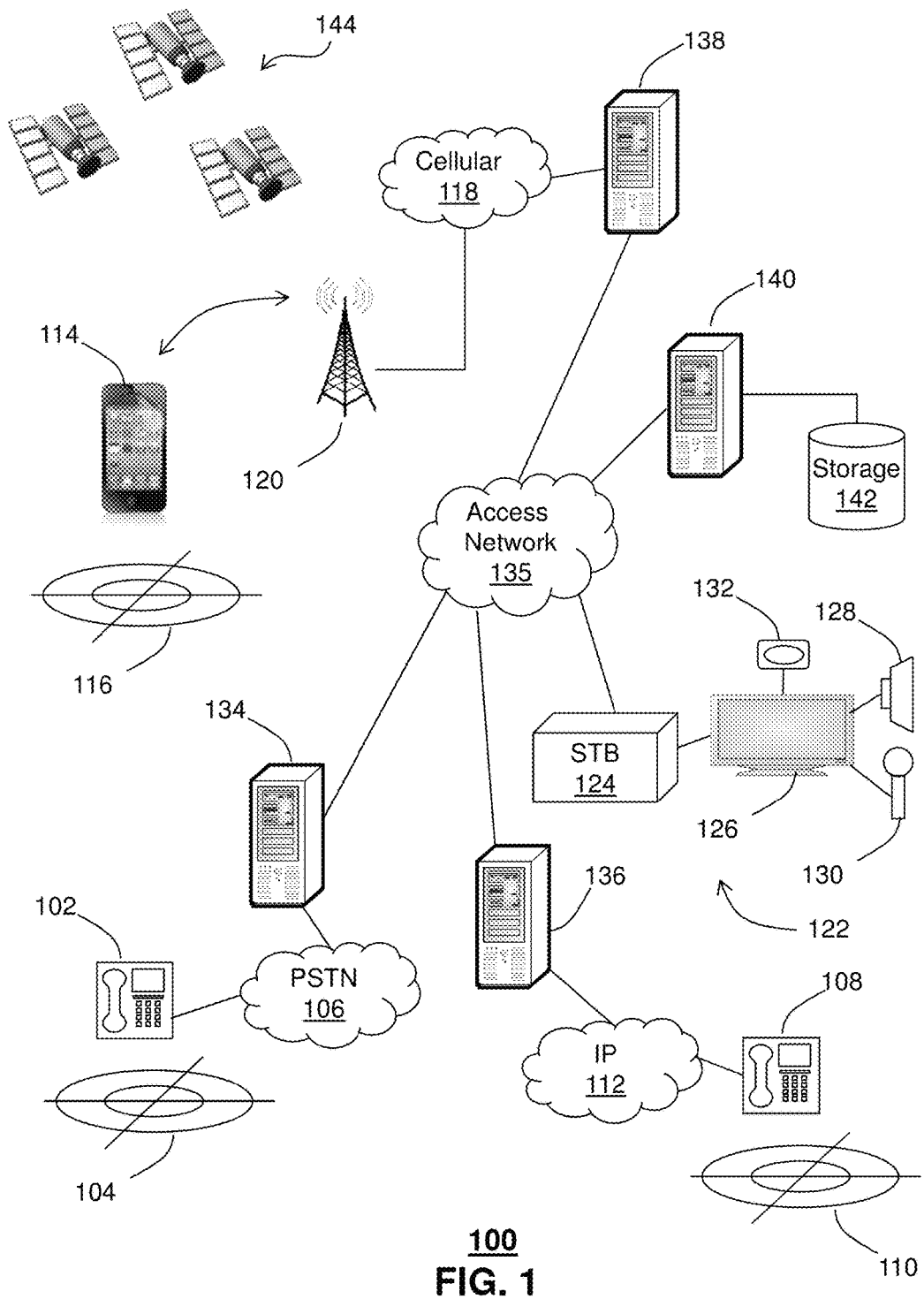
FIG. 1 depicts an illustrative embodiment of a voice communication system including various voice and data service networks.

The subject disclosure describes, among other things, illustrative embodiments of processes, devices and software for receiving a new call request in response to equipment of a calling party placing a call from a calling-party location to equipment of a called party, wherein the new call request includes an identity of the equipment of the calling party. An identity of the calling-party is determined associated with the equipment of the calling party. A location of the equipment of the calling party is determined and a location indicator is generated responsive to the identity of the calling-party and the location of the equipment of the calling party. The location indicator is presented to a display of the equipment of the called party. Other embodiments are included in the subject disclosure.

One embodiment of the subject disclosure includes a method including receiving, by a location analyzer comprising a processor, an incoming-call signal in response to equipment of a calling party placing a call from a calling-party location to equipment of a called party. The incoming-call signal includes a calling-party identification and the equipment of the called party includes a display. The location analyzer determines an identity of the calling party, and a current calling-party location of the equipment of the calling party. The location analyzer generates a location indicator responsive to the identity of the calling party and the current calling-party location, wherein the location indicator is presented to the display of the equipment of the called party, responsive to the incoming-call signal.

Another embodiment of the subject disclosure includes a device including a memory to store executable instructions and a processor in communication with the memory. The processor, responsive to executing the instructions, performs operations including receiving an incoming-call signal in response to equipment of a calling party placing a call from a calling-party location to equipment of a called party. The incoming-call signal includes a calling-party identification, and the equipment of the called party comprises a display. The operations include determining the calling-party identification associated with the equipment of the calling party, and determining a current calling-party location of the equipment of the calling party. The operations further include generating a location indicator responsive to the calling-party identification and the current calling-party location. The location indicator is presented to the display of the equipment of the called party.

Yet another embodiment of the subject disclosure includes a machine-readable storage medium including instructions, wherein execution of the instructions causes a processor to perform operations including receiving a new call request in response to equipment of a calling party placing a call from a calling-party location to equipment of a called party. The new call request includes an identity of the equipment of the calling party, and the equipment of the called party includes a display. The operations include determining an identity of the calling-party based on an association between the identity and the equipment of the calling party. The operations further include determining a location of the equipment of the calling party and generating a location indicator based on the identity of the calling-party and the location of the equipment of the calling party. The location indicator is presented to the display of the equipment of the called party.

FIG. 1 depicts an illustrative embodiment of a communication system 100 including various communication devices and voice and data service networks. A plain old telephone service (POTS) communication device 102 at a first location 104, is coupled to a public switched telephone network 106. The communication device 102 can be interconnected to the public switched telephone network 106 by landlines. The first location may be a residence or a business within which the communication device 102 is installed.

A VoIP terminal 108 at a second location 110 is coupled to a packet-switched data network, such as an IP network 112. The VoIP terminal 108 can be interconnected to the IP network 112 by a cable service provider, a dial-up service, another network, such as a campus-wide Ethernet, or a wireless network, such as a wireless local area network, e.g., WiFi, a wireless personal network, e.g., Bluetooth, or the like. The second location 110 may once again be a residence or a business within which the VoIP terminal 108 is installed. In some embodiments, however, the location 110 is subject to change, because the VoIP terminal 108 is s mobile device. By way of example, a VoIP phone application or soft-phone can be installed on a laptop computer or other mobile IP device, such as a tablet computer.

A mobile cellular phone 114 at a third location 116, is coupled to a cellular radio network 118, e.g., by way of a cellular base station 120. The third location 116 will tend to vary according to a position of the mobile cellular phone 114 at the time of a call. In some instances, the location of the mobile cellular phone 114 can vary during the course of a call, e.g., if the mobile cellular phone 114 is in motion, e.g., carried by a user who is walking, riding, e.g., on a train or in a car.

A multimedia services subscriber system 122 includes a media processor 124, e.g., a set-to box and a display device 126. The subscriber system 122 is in communication with a subscriber access network 135, e.g., through which subscriber services can be provided or otherwise delivered to the subscriber system 122. The subscriber system 122 includes one or more of an audio output device, e.g., a speaker 128 and an audio input device, e.g., a microphone 130, e.g., to support voice communication services. In some embodiments, the system 122 also includes a video camera 132, e.g., for supporting video conferencing services. The subscriber system 122 is also provided at a respective location, e.g., a subscriber's home, or a particular room within the subscriber's home. Although the example refers to a home-based subscriber system 122, it is understood that such features can be provided on a mobile platform, such as a laptop computer, a tablet computer, a smart phone, and the like.

The POTS communication device 102 can communicate with other POTS communication devices, e.g., landline devices (not shown), through the public switched telephone network 106, the VoIP terminal 108 can communicate with other VoIP terminals (not shown) through the IP network 112 and the mobile cellular phone 114 can communicate with other cellular phones (not shown) through the cellular radio network 118. It is also desirable for such communication devices 102, 108, 114 to make and receive calls from other communication devices, e.g., associated with other communication systems, referred to herein as cross-network connectivity. For example, a landline communication device 102 can make and/or receive calls from a mobile cellular phone 114 or a VoIP terminal 108.

In order to support such cross-network connectivity, one or more of the communication networks 106, 112, 118 of the system 100 include one or more gateway devices or systems. In the illustrative example, a first gateway processor 134 is in communication between the public switched telephone network 106 and the subscriber access network 135. Likewise, a second gateway processor 136 is in communication between the IP network 112 and the subscriber access network 135, and a third gateway processor 138 is in communication between the cellular radio network and the subscriber access network 135. Call handling between such devices is generally well known.

The communication system also includes a server 140 in communication with the subscriber access network and an electronic storage module 142. The electronic storage module 142 can include a single storage module, such as a single hard disk driver, an array of storage devices, flash memory, magnetic tape storage device, or a combination of one or more such devices. The electronic storage module 142 can be electrically connected to the server 140 as shown, located remotely, e.g., as a network accessible storage service, or some combination of both.

In at least some embodiments, the server 140 provides one or more services to subscriber equipment, such as the multimedia services subscriber system 122. The server 140 can be configured to provide one of a caller identification (ID) service, a call location service, or a combination of both. In some embodiments the server 140 processes the location information according to one or more rules. Application of the rule(s) to the location information can produce a result, e.g., a resultant value that can be provided along with caller ID information during a new call request.

By way of illustrative example, the POTS communication device 102 initiates a call to the subscriber system 122. During initiation of the call, the POTS communication device 102 sends signaling information through the public switched telephone network 106. The signaling information can be in-band signaling, or out-of-band signaling. The signaling information can include a telephone number of the called party, e.g., the subscriber system 122. The signaling information can also include a caller ID, e.g., a telephone number, of the POTS communication device 102. The signaling information can be forwarded by the first gateway processor 134 to the subscriber access network 135. It is understood that one or more system components of the public switched telephone network 106, or the subscriber access network 135, or a third party service, can process the signaling information, as required, to ensure compatibility across the different networks 106, 135. Generally, modified signaling information can retain common information, such as a destination address of the call, a caller ID and perhaps other information related to call monitoring, quality, billing, etc.

Figure 2:
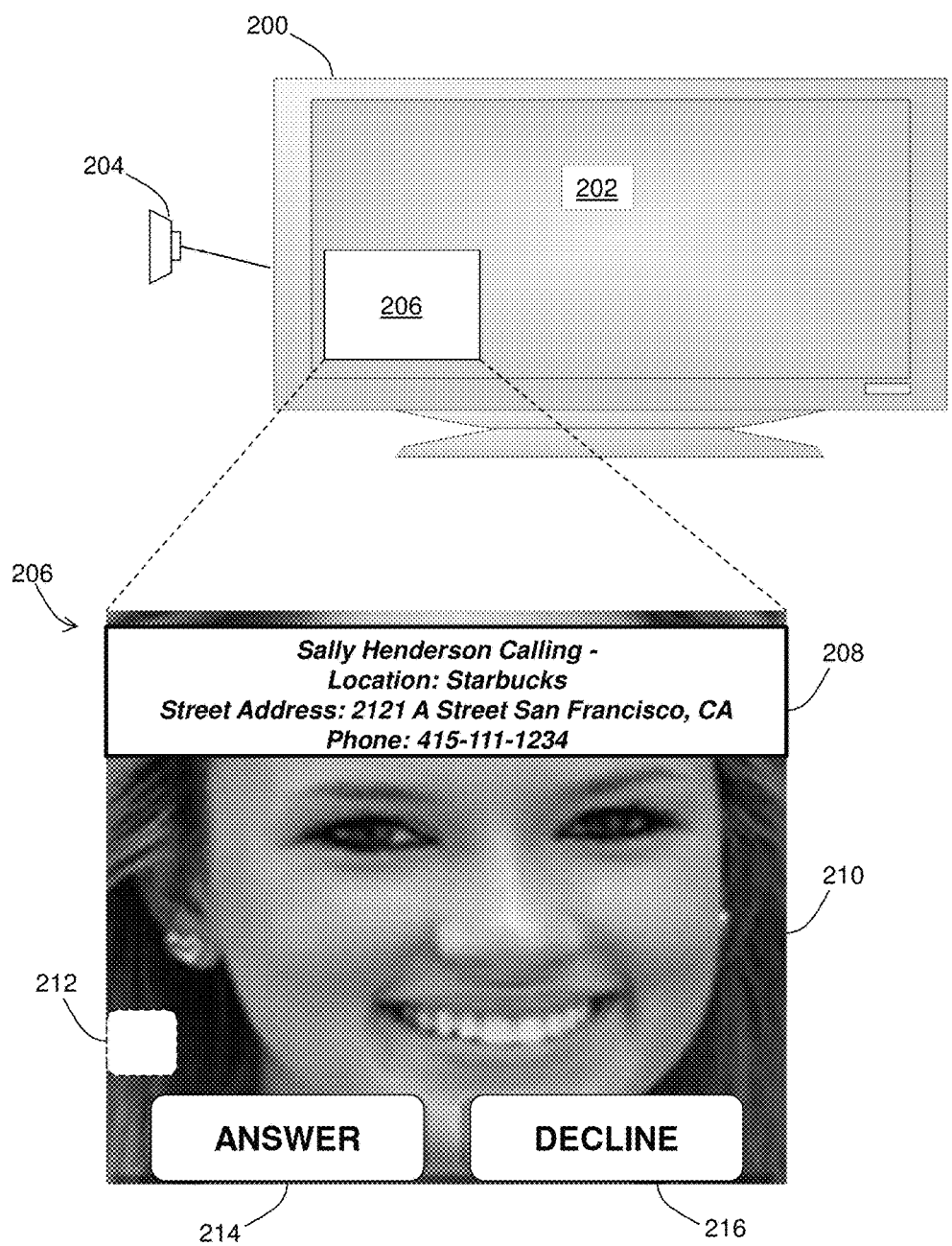
FIG. 2 depicts an illustrative embodiment of a multimedia display of FIG. 1, with detail of an example incoming call indicator.

FIG. 2 an illustrative embodiment of a multimedia device 200, with a detail inset of an example of a call indicator panel 206. The multimedia device 200 includes a display panel 202 for displaying visual media content, such as video, photo images, web-pages, and the like. The multimedia device 200 can include one or more speakers 204 for providing audio output. The speakers 204 can be provided as an integral feature of the multimedia device 200, as part of a separate audio processing system, such as a stereo or surround sound system, a headset, earphone, or some combination of such audio processing techniques.

In response to an in-coming call signal, the multimedia device 200 displays a call indicator. The call indicator can include one or more of a visual component and an audio component. An example of a visual component includes a call indicator panel 206 that can be displayed temporarily, e.g., for 5 or 10 seconds or more, as an annunciation of one or more of a new call, a voice mail message or a message waiting. The display panel 202 can portray the call indicator panel 206 as an overlay, e.g., a window, of other visual content being presented by the display panel 202, such as a broadcast television program, video on demand, e.g., a unicast presentation of a program, pre-recorded multimedia content, or the like. Alternative presentations of the call indicator panel 206 include, without limitation, a split screen presentation. In at least some embodiments, the call indicator includes an audio portion, such as beep, a ring, a ring-tone, an audio clip, or the like. Such audio portions can alert a viewer who may not be viewing the screen at the time the in-coming call is received. Thus, the audio portion can garner the attention of the viewer, allowing the viewer to then view the call indicator panel 206.

The call indicator panel 206 can include textual content, such as a textual caller ID portion or insert 208. The caller ID insert 208 can include one or more of a phone number of the calling party, an individual/family/business name of the calling party, an address of the calling party, or other indicial of the calling party, such as a nickname, a pet name, a relationship (e.g., Dad, Mom, Sis') an email address, a web site, or the like. In some embodiments, the caller ID insert 208 is not automatically displayed during annunciation of an incoming call. Instead, it can be accessed by a viewer, e.g., by way of a click through, in which a controllable element, such as a button or soft key associated with the call indicator panel 206, some other portion of the display panel 202, and/or a physical user interface, such as a remote control (not shown).

The caller ID insert 208 can include a textual reference to a location of the calling party. The location can be obtained, e.g., from the calling device itself, thereby providing some level of assurance of accuracy of the location information. In some embodiments, one or more of the caller ID insert 208, the call indicator panel 206, the location indicator 212 or the image 210 can provide an indication as to a source of the location information. By way of non-limiting example, the location information can be provided or otherwise reported by equipment of the calling party, such as the calling-party's mobile phone. The location information can include geo-location coordinates, such as a latitude and longitude as might be obtained by way of a GPS receiver. Other location information can include an address and/or name of a business name, a venue name, e.g., Starbucks's. Alternatively or in addition, the location information can include a street address, e.g., 2121 A Street, San Francisco, a cross street, or other suitable means of location.

Other sources of location information can include one or more of the communication networks, such as the cellular radio network 118 (FIG. 1), e.g., according to a cell tower identification or other estimation, e.g., by triangulation of cell towers, the IP network 112, e.g., according to particular IP address, wireless access point, and/or media access control that might otherwise be identified with an identifiable location, such as business or residence, or the public switched telephone network, e.g., according to an originating phone number, subscriber records, a particular local exchange switch, area code, or other form of identification.

In at least some embodiments, the call indicator panel 206 includes an image 210. The image 210 can include one or more of a graphical component, e.g., a photo image associated with the calling party, such a portrait or similar photo image capturing a visually recognizable image of or otherwise associated with the calling party. Presentation of the image 210 can be included as an integral feature of the call indicator panel to allow for instant viewer recognition of the calling party, without the viewer having to necessarily read any of the textual content of the caller ID insert 208. When presented with or without the caller ID insert 208, the call indicator panel 206 can convey easily recognizable information without necessarily providing textual content.

In some embodiments, the image 210 is determined according to a pre-determined association between the identity of the calling party and the image 210. The pre-determined association can be established by one of the calling party, the call recipient, or both. The association(s) can result from a selection process, e.g., accomplished during a configuration of a caller identification and/or caller location service. In some embodiment, an association by a call recipient takes precedence over an association of the calling party. The predetermined associations, the images 210, or both, can be stored locally, e.g., on one of a caller's equipment or a call recipient's equipment. In some instances, the pre-determined associations can be stored remotely, e.g., by a caller identification and/or call location service provider or other such application.

Such associations can be accomplished by the caller or the call recipient, as the case may be, during a configuration phase. The configuration phase, e.g., can be selectively entered upon selection by the caller and/or call recipient to perform such associations and otherwise configure any other configurable features of the caller identification/location service. The images 210 themselves can be obtained from the caller's/call recipient's image collection, e.g., photo album. Alternatively or in addition, the images can be obtained remotely, e.g., from a collection of images as can be provided by a service provider. In some instances, one or more of the images 210 can be obtained from a third party source, such as a social media service, e.g., Facebook®. A caller's photo displayed during call can be obtained, e.g., from a user's social media account. Such picture can be obtained from the third-party source in real-time, e.g., during the call, or periodically, e.g., daily, weekly, or once. In some embodiments, the images are provided by a service provider.

The call indicator also includes a location indicator. The location indicator can include an audio location indicator, such as beep, a ring, a ring-tone, an audio clip, or the like. A presence of an audio location indicator can signify one or more of a caller's identity or a caller's location or some combination of both. For example, if an incoming call is from a family member, e.g., a child, and the child's location corresponds to an expected location, a first audio incoming-call alert can be provided. This audio alert may be generic for any incoming call, or specific to the calling party's identity, e.g., a family member, a child. If the incoming call is from the child, however, and the child's location does not correspond to an expected location, e.g., school, a friend's house, or if the child's location corresponds to a particular unauthorized location, e.g., downtown, the shopping mall, etc., the incoming-call alert can provide a distinguishable audio incoming-call alert, such as an alarm having one or more of a distinct sound and our volume, e.g., an increased volume for an alert.

Alternatively or in addition to the audio location indicator, the location indicator can include a location indicator 212, such as a button, panel, frame, light, or the like. A presence of the location indicator 212 can signify one or more of a caller's identity or a caller's location or some combination of both. Continuing with the previous example, if the child's location corresponds to an expected location, a first location indicator 212 for an incoming-call can be provided. This first location indicator 212 can be a generic indicator, e.g., for any incoming call—consider a green or blue light location indicator 212. If the incoming call is from the child, however, and the child's location does not correspond to an expected location or if the child's location corresponds to a particular unauthorized location, the location indicator 212 can provide a distinguishable visual incoming-call alert, such as a red light location indicator 212. In some embodiments, an alarm or alert status, e.g., according to an unauthorized (red) or unknown (yellow) can be portrayed with other features to distinguish from a known or otherwise authorized location.

In addition to colors, other distinguishing features of the location indicator 212 can include the use of a flashing, changes in shape, size or movement of one or more of the location indicator 212 or the call indicator panel 206.

Alternatively or in addition, such location indicator features can include one or more of controlling a positioning, size, or content of the call indicator panel 206. For example, the call indicator panel can be positioned in a lower corner of the display panel 202, e.g., as shown, for typical call, versus at a central or otherwise more prominent location for a location-related alarm or alert. Likewise, a size of the call indicator panel 206, can be relatively small, e.g., less than 10% or 25% of the display area of the display panel 202 for typical calls, versus a larger size, e.g., 30%, 50% or even 100% of the display area for a location-related alarm or alert.

In some embodiments, the call indicator panel can include an indication of the location of the caller at the time of the call. Such indications of locations can include a map and/or satellite image, e.g., of an area containing a location of the caller. The map/image can include one or more annotations, such as a mark denoting the caller location. Other annotations can be provided, such as landmarks, known addresses, the call-recipient's location, and so forth. Alternatively or in addition, the indication of location can include an identification of a range or distance, e.g., between the calling party and the call recipient, between the calling party and some other reference location, e.g., a school, place of business or other venue. Other examples include an indication that a calling-party location is local, long distance, e.g., out of state, international, and so forth. Other aspects of the indication of the location can take into account an identity of the calling party, such as a friend or family member, an individual or a business, identified or caller ID blocked, whether the calling party is identified in a phone book or other directory, including a personal address book, e.g., of the call recipient. With any of the features disclosed herein, it is understood that in at least some embodiments a caller can selectively block reporting of location information, including information provided by the caller's equipment as well as information provided by any intervening network or other processing devices.

In at least some embodiments, the call indicator panel 206 includes one or more interactive elements. For example, in the illustrative embodiment, the call indicator panel 206 includes an "Answer" soft key or button 214. The answer soft key 214 can be selected by a viewer by pointing to and clicking, highlighting or otherwise selecting the answer soft key 214 during presentation of the call indicator panel 206. Likewise, the call indicator panel 206 can include a "Decline" soft key button 216. The decline soft key 216 can be selected or otherwise actuated during presentation of the call indicator panel 206 to decline the incoming call. In response to selection of the decline soft key 216, presentation of the call annunciator, e.g., including the call indicator panel 206, including any audio annunciator that might be provided, can be removed from the multimedia device 200.

Figure 3:
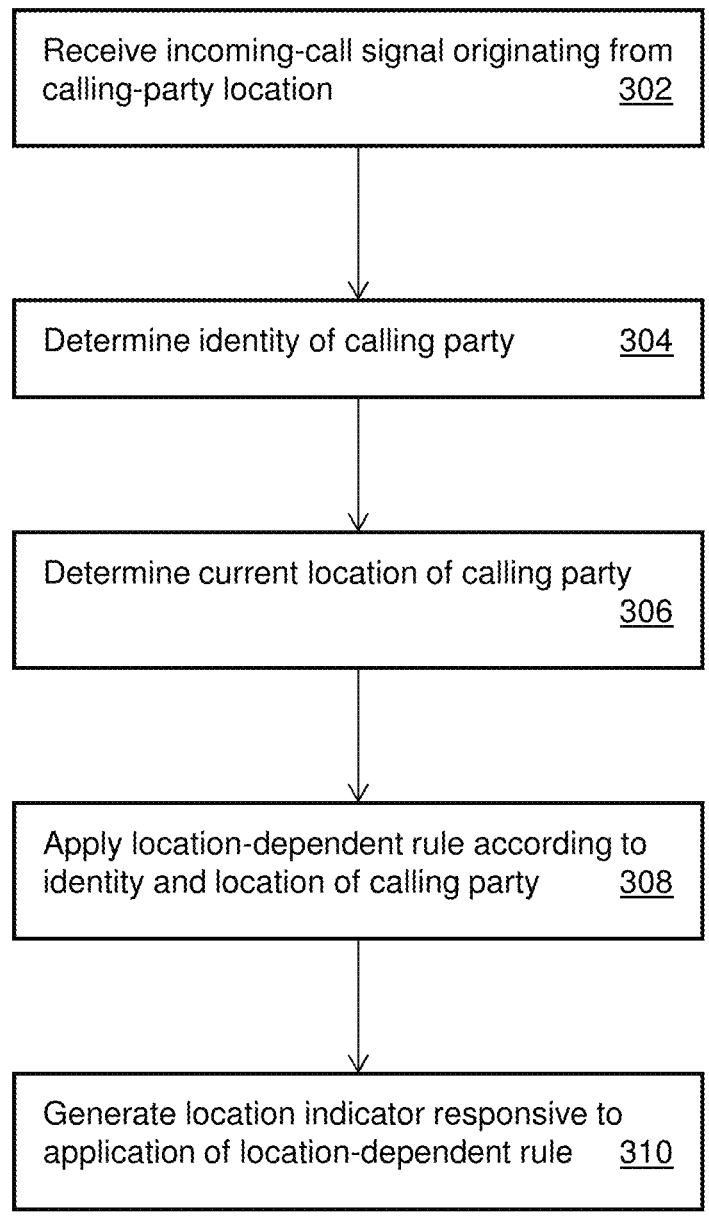
FIG. 3 depicts an illustrative embodiment of a caller identification process operating in portions of the system described in FIG. 1.

FIG. 3 depicts an illustrative embodiment of a caller identification process 300 comprising location dependent information. The process 300 can be used to identify location-dependent information based upon a calling-party identification and an originating location of the call. The location-dependent information can be presented to a called party, e.g., along with a general annunciation of an incoming call from the calling party. The location-dependent information can vary according to an identity of the calling-party, e.g., according to one or more rules. The rules, can be provided as default rules, e.g., dependent upon an identity of the calling party being included in a directory, such as a service provider's directory, a third party directory, e.g., a white page or business listing, a call recipient's personal address book, or some combination thereof. Alternatively or in addition, the rules can be customized or otherwise defined by one of the calling party, the call recipient, or a combination thereof as further identified herein.

A calling party initiates a call from equipment of the calling party, e.g., a mobile cellular phone 114 (FIG. 1). The calling party identifies a call recipient, e.g., by dialing a phone number, selecting an entry from an address book, entering a shortcut, e.g., a speed dial, or any other known manner of initiating a voice and/or video call. One or more of the service providers generate alone or in cooperation an incoming-call signal for distribution to equipment of the called party, e.g., the multimedia services subscriber system 122. Thus, at 302, equipment of the call recipient receives the incoming-call signal from the call originating from calling-party location.

Information provided by the incoming call signal, can include information identifying one or more of equipment of a calling party or the identity of the calling party. Such identifying information can include one or more of a phone number, device identifier, e.g., an equipment ID (EID), or other user identification, such as a directory listing associated with such phone numbers, equipment IDs and the like. Such identifying information allows for a determination of the identity of calling party at 304. For example, the equipment of the called party can simply present an indication of one or more of the calling party's phone number or an associated directory listing.

A location of the calling party is provided at 306. In at least some embodiments, the location is a current location of the equipment of the calling party at or about the time a call is placed. As disclosed above, the location can be determined according to various techniques, such as a self-reported location provided by the equipment of the calling party. For example, a mobile cellular phone 114 (FIG. 1), such as a multi-function, i.e., smartphone, can include a GPS receiver. The GPS receiver can determine an approximate location of the mobile cellular phone 114 according to navigation assistance signals provided from the GPS constellation of satellites 144. The current location can be determined in response to a user initiating a call. Alternatively, the current location can be a previously determined location, such as a last previously determined location of a periodically updated location. In some embodiments, a time associated with the location, or a duration since the last location update can be provided to the equipment of the call recipient. It is envisioned that in at least some instances, a known location can be established and updated by a navigation system, e.g., according to dead reckoning, or similar updates by an inertial guidance system.

Location-dependent rules can be applied, at 308, according to an identity and location of calling party. As disclosed above, the rules, can be provided as default rules, customized or otherwise defined by one of the calling party, the call recipient, or a combination thereof. A location of the equipment of the calling party at the time of the call can be processed according to various techniques. By way of illustrative example, the location can be associated with a particular address, e.g., business, residence or similar venue, a geographic region, e.g., a, a neighborhood, town, state, country, user defined geographic region. User defined geographic regions can include geometric shapes determined by the user in relation to a map. An example might include a regular shape, such as a polygon or circle on a map, about a particular geo-location, address, etc. Accordingly, it can be determined whether a call originated from within or without such an identified location or region.

By way of further example, defined geographic regions can be determined with respect to a reference location, such as a particular address or geo-coordinate. Such locations can be identified according to one or more of a range or a bearing from the reference location. Consider a child who has been allowed to visit a particular friend's home. The address of the friend's home can be identified as a reference location. The child's current location at the time of a call, e.g., to a parent, can be determined. A reference to the authorized location can be determined, e.g., according to a range and/or a bearing reported to or otherwise determined by one or more of equipment of the parent or the service provider. The determined range and/or bearing from the child' phone to the reference can be compared to an authorized range, bearing or region. If the range and/or bearing are determined to be within an authorized limit according to the rule, a location indicator indicative of a safe call can be provided to or otherwise determined by the equipment of the parent at 310. If, however, the range and/or bearing are determined not to be within the authorized limit, the location indicator can indicate an unsafe call, a potentially unsafe condition, or at the very least a violation of an authorized location, zone or region. Thus, a parent can be alerted immediately upon receipt of a call from a child, before answering the call, that the child is not where he/she is expected or otherwise supposed to be. Other applications of identified zones can include zones of operation or patrol associated with work crews, e.g., highway crews, snow plows, delivery crews, rescue crews and so forth. Calls to an employer and/or dispatcher can provide immediate information related to the current location that can be used to route calls, establish alarms, generate reports, and the like.

In addition to being tailored or otherwise related to a particular caller, class of caller, e.g., friend, family member, neighbor, co-worker, employer, one or more of application of the location-dependent rule at 308 or generation of the location indicator at 310 can apply schedule information. For example, a schedule of a calling party can be accessed or otherwise used to establish a location-dependent rule. Consider an individual's schedule including home activities, transportation to/from a place of business, working at the place of business, extracurricular activities, such a shopping, social meetings and so forth. A call from party A to party B can provide identification of the caller, i.e., party A, and a location of party A at the time of the call. The location of party A can be compared to expected locations associated with the party A's schedule. A location indicator can be determined at 310, e.g., according to the location being as compliant or non-compliant with an expected location. Thus, a call from a student to a parent during school hours that originates from a location other than school can cause an alarm or similar alert.

As described above, a location indicator is generated at 310 responsive to application of location-dependent rule at 308. The location indicator can include one or more of visual components, size, shape, color, text, etc., or audio components, e.g., beeps, alarms, ringtones, audio clips and the like.

Figure 4:
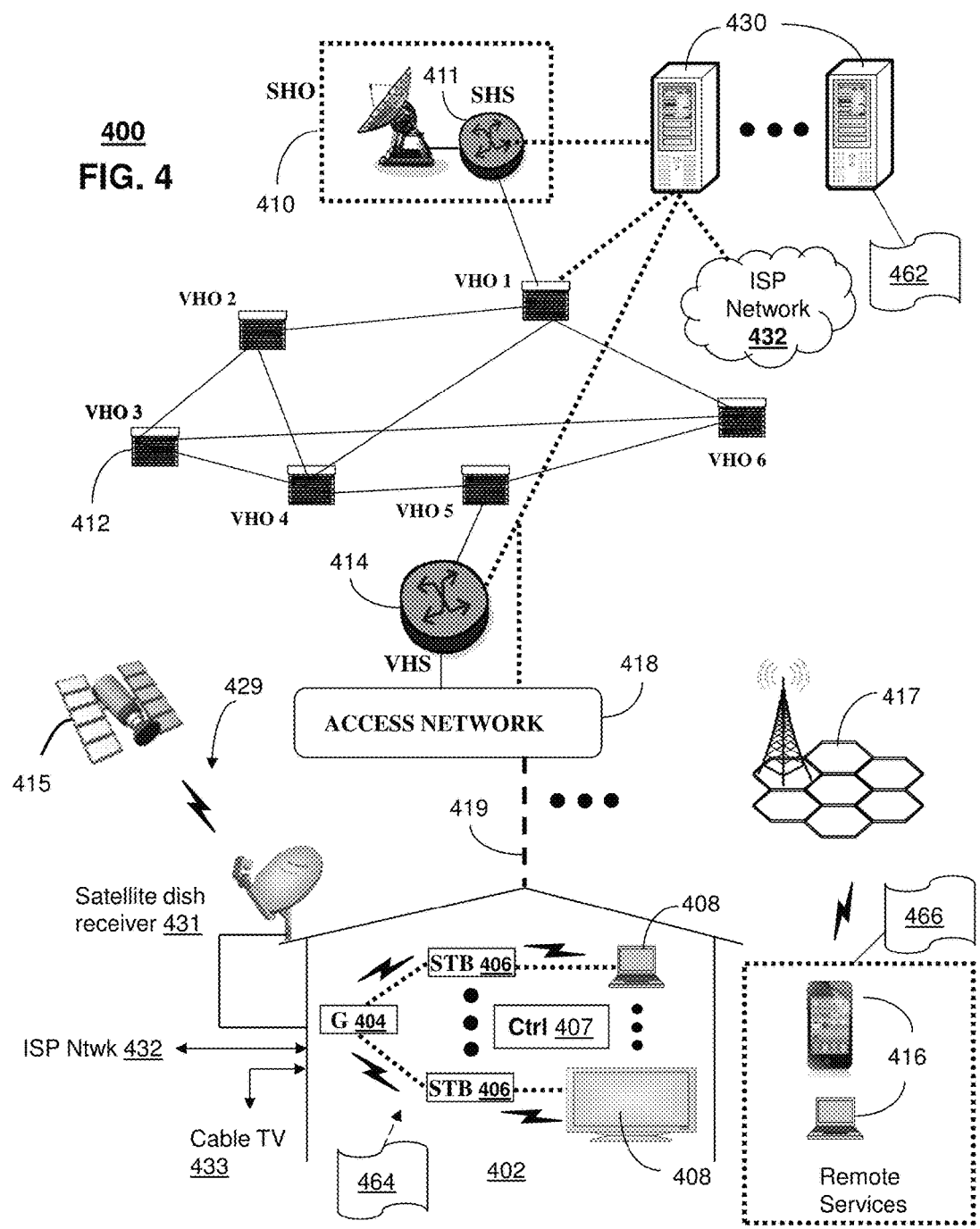
FIGS. 4-5 depict illustrative embodiments of communication systems that provide media services including caller identification services as described in FIGS. 1-2.

FIG. 4 depicts an illustrative embodiment of a communication system 400 for delivering media content. The communication system 400 can represent an Internet Protocol Television (IPTV) media system. Communication system 400 can be overlaid or operably coupled with the communication system 100 figure of FIG. 1 as another representative embodiment of communication system 400. For example, a server 430 can receive a new call request in response to equipment of a calling party, e.g., one of the wireless communication devices 416, placing a call from a particular location to equipment of a called party, e.g., the gateway processor 404 and/or media processor 406. An identity of the calling-party, e.g., a phone number, a subscriber name and/or address, from the new call request is determined to be associated with the equipment of the calling party. A location of the equipment, e.g., the wireless communication device 416, is determined and a location indicator is generated responsive to the identity of the calling-party and the location of the equipment of the calling party. Responsive to the new call request, the location indicator is presented to a display of the equipment of the called party, e.g., the display of media device 408.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway processor 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway processor 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway processor 404, the media processors 406, and media devices 408 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

The subject disclosure can apply to other present or next generation over-the-air and/or landline media content services system.

Some of the network elements of the IPTV media system can be coupled to one or more servers 430, a portion of which can operate as a web server for providing web portal services over the ISP network 432 to wireline media devices 408 or wireless communication devices 416.

The communication system 400 can also provide for all or a portion of the servers 430 to function as a location analysis server (herein referred to as location analyzer server 430). The location analyzer server 430 can use computing and communication technology to perform a location-analysis function 462, which can include among other things, receiving a new call request in response to equipment of a calling party, e.g., one of the wireless communication devices 416, placing a call from a particular location to equipment of a called party, e.g., the gateway processor 404 and/or media processor 406, e.g., set-top box. The location-analysis function 462 associates an identity of the calling-party, e.g., a phone number, a subscriber name and/or address, from the new call request. The location-analysis function 462 determines a location of the equipment, e.g., the wireless communication device 416, generates a location indicator responsive to the identity of the calling-party and provides the location to the equipment of the called party, e.g., one or more of the gateway processor 404 or the media processor 406. Responsive to the new call request, the location indicator is presented to media device 408 for display.

The media processors 406 and wireless communication devices 416 can be provisioned with caller identification support software functions 464 and 466, respectively, to utilize the services of the location analyzer server 430. For example, a first caller identification support software function 464 can process caller identification and/or location information received, e.g., from the location analyzer. A second caller identification support software function 466 can provide device location information, e.g., during the course of initiating a new call from the wireless communication device 416.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
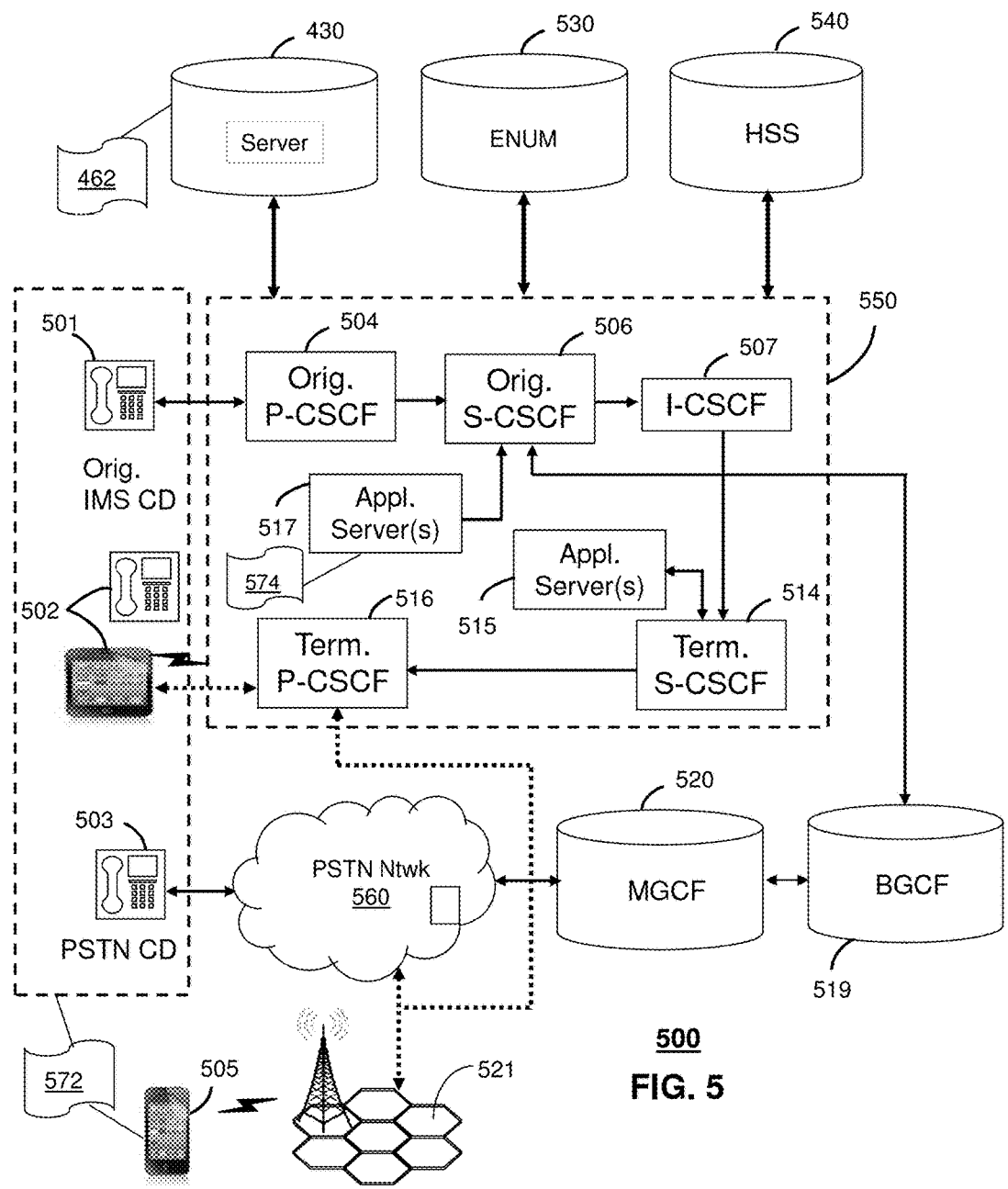

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with system 100 of FIG. 1 and communication system 400 as another representative embodiment of communication system 400. For example, the location analyzer server 430 can receive a new call request in response to equipment of a calling party, e.g., the wireless communication devices 505, placing a call from a particular location to equipment of a called party, e.g., an IMS communication device 502. An identity of the calling-party, e.g., a phone number, a subscriber name and/or address, from the new call request is determined to be associated with the equipment of the calling party. A location of the equipment, e.g., the wireless communication device 505, is determined and a location indicator is generated responsive to the identity of the calling-party and the location of the equipment of the calling party. Responsive to the new call request, the location indicator is presented to a display of the equipment of the called party, e.g., the display of IMS communication device 502.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM server 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM server 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular access base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular access base station 521 may communicate directly with the IMS network 550 as shown by the arrow connecting the cellular access base station 521 and the P-CSCF 516.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The location analyzer server 430 of FIG. 4 can be operably coupled to the second communication system 500 for purposes similar to those described above. The location analyzer server 430 can perform a location-analysis function 462 and thereby provide caller ID services according to an analysis of locations of the CDs 501, 502, 503 and 505 of FIG. 5. CDs 501, 502, 503 and 505, which can be adapted with software to perform a caller-identification function 572 to utilize the services of the location analyzer server 430. The location analyzer server 430 can be an integral part of the application server(s) 517 performing a caller identification support function 574, which can be substantially similar to the location-analysis function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
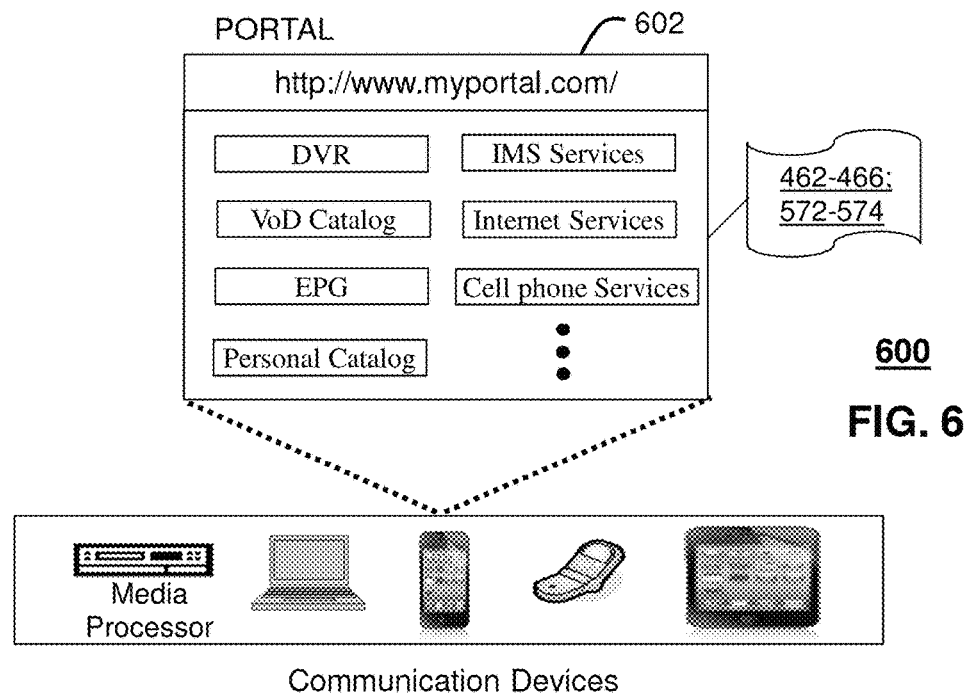
FIG. 6 depicts an illustrative embodiment of a web portal for interacting with the communication systems of FIGS. 1 and 4-5.

FIG. 6 depicts an illustrative embodiment of a web portal 602 which can be hosted by server applications operating from the location analyzer server 430 of the communication system 100 illustrated in FIG. 1. Communication system 600 can be overlaid or operably coupled with communication system 100, communication system 400, and/or communication system 500 as another representative embodiment of the system 100 of FIG. 1, communication system 400, and/or communication system 500. The web portal 602 can be used by one or more of a calling party, a called party or a third party, e.g., a service provider, to coordinate or otherwise configure features, such as caller identities, locations, rules based on one or more of the calling party, the calling party location or other information, e.g., preferences. The web portal 602 can be used for managing services of communication systems 400-500. A web page of the web portal 602 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision one or more of the software applications 462-466, and 572-574 to adapt or configure these applications as may be desired by subscribers and service providers of communication systems 400-500.

Figure 7:
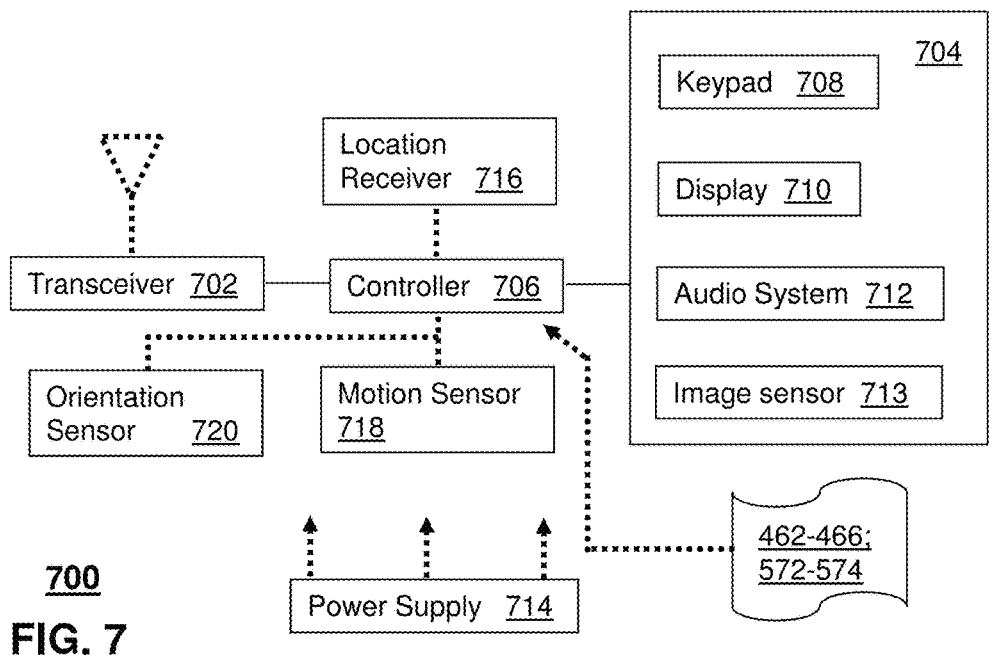
FIG. 7 depicts an illustrative embodiment of a communication device.

FIG. 7 depicts an illustrative embodiment of a communication device 700. The communication device 700 can serve in whole or in part as an illustrative embodiment of the devices depicted in FIGS. 4-5. A new call request is generated in response to equipment of a calling party, e.g., the communication device 700, placing a call from a calling-party location to equipment of a called party, e.g., another similar or different communication device 700, wherein the new call request includes an identity of the equipment of the calling party. An identity of the calling-party is determined based on an association between the identity and the equipment of the calling party. A location of the equipment of the calling party is determined and a location indicator is generated based on the identity of the calling-party and the location of the equipment of the calling party. The location indicator is presented to a display of the equipment of the called party, responsive to the new call request To enable these features including caller identification and location, communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth, ZigBee, WiFi, DECT, or cellular communication technologies, just to mention a few. Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of the media processor 406, the media devices 408, or the wireless communication devices 416 of FIG. 4, as well as the IMS CDs 501-502 and PSTN CDs 503-505 of FIG. 5. It will be appreciated that the communication device 700 can also represent other devices that can operate in communication systems 400-500 of FIGS. 4-5 such as a gaming console and a media player.

The communication device 700 shown in FIG. 7 or portions thereof can serve as a representation of one or more of the devices of communication system 100 of FIG. 1, the multimedia device 200 of FIG. 2, communication system 400, and communication system 500. In addition, the controller 706 can be adapted in various embodiments to perform the functions 462-466 and 572-574, respectively.

Upon reviewing the aforementioned embodiments, it would be evident to an artisan with ordinary skill in the art that said embodiments can be modified, reduced, or enhanced without departing from the scope of the claims described below. For example, one or more of application of the location dependent rules and generation of the location indicator can be provided by a single device, such as equipment of the call recipient, e.g., the multimedia services subscriber system 122, equipment of the calling party 102, 108, 114, third party equipment, such as a one or more network accessible servers 140, 430. In some embodiments, processing is distributed over one or more of the aforementioned devices and/or systems. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
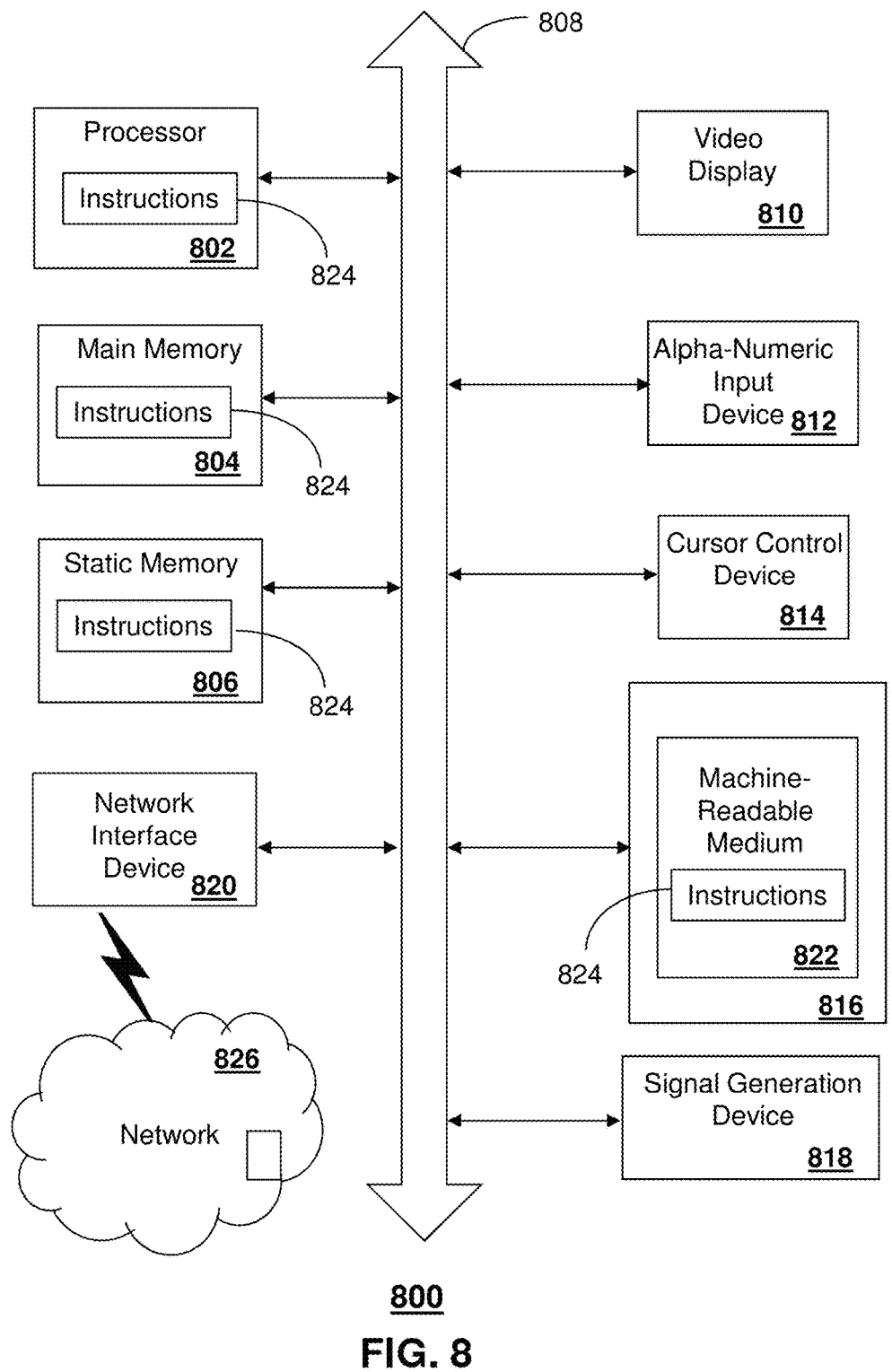
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods describe above. One or more instances of the machine can operate, for example, as the server 140, 430, the media processor 124, 406, the gateway processor 404, the communication devices 102, 108, 114 the network gateway processors 134, 136, 138 the wireless communication devices 416, and other devices of FIGS. 1-7. In some embodiments, the machine may be connected (e.g., using a network 826) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of executable instructions (e.g., software 824) embodying any one or more of the methods or functions described herein, including those methods illustrated above. The executable instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable array. Furthermore, software implementations (e.g., software programs, instructions, etc.) can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A method, comprising:
receiving, by a location analyzer comprising a processor, an incoming-call signal in response to equipment of a calling party placing a call from a calling-party location to equipment of a called party, wherein the incoming-call signal comprises a calling-party identification, and wherein the equipment of the called party comprises a media processor associated with a subscriber access network, the media processor being in communication with a display;
determining, by the location analyzer, an identity of the calling party based on the calling-party identification, wherein the identity includes a calling-party schedule;
determining, by the location analyzer, a current calling-party location of the equipment of the calling party based on the calling-party location;
obtaining, by the location analyzer, a location-dependent rule for the identity of the calling party and the current calling-party location;
determining, by the location analyzer, a current user of the media processor;
determining, by the location analyzer, a class of caller based on the identity of the calling party and a relationship association with the current user of the media processor;
determining, by the location analyzer, an expected location for the calling party based on the calling party schedule and on a time that the incoming-call signal is received;
determining, by the location analyzer, whether the current calling-party location conflicts with the expected location;
determining, by the location analyzer, whether the class of caller includes an unexpected location alarm, wherein the unexpected location alarm indicates that the class of caller for the calling party is to be location monitored by the current user of the media processor;
determining, by the location analyzer, whether the current calling-party location violates the location-dependent rule; and
responsive to determining that the class of caller includes an unexpected location alarm and that the unexpected location alarm indicates that the class of caller for the calling party is to be location monitored by the current user of the media processor:
generating, by the location analyzer, a location indicator responsive to the determining the identity of the calling party and the current calling-party location, wherein the location indicator is presented to the display of the equipment of the called party, responsive to the incoming-call signal, wherein the indication comprises a visual presentation independent of the current calling-party location;
indicating whether the current calling-party location violates the location-dependent rule responsive to determining that the current calling-party location violates the location-dependent rule; and
providing an unexpected location alert responsive to determining the current calling-party location conflicts with the expected location.

2. The method of claim 1, further comprising:
  determining, by the location analyzer, according to the identity of the calling party, a photographic image comprising an image of the calling party; and
  presenting, by the location analyzer, the photographic image to the display during an annunciation of the incoming-call signal, wherein the photographic image comprising the image of the calling party allows for immediate recognition of the identity of the calling party at the display of the equipment of the called party.

3. The method of claim 2, wherein the determining whether the current calling-party location violates the location-dependent rule further comprises:
  determining, by the location analyzer, for the identity of the calling party, one of an authorized location, an unauthorized location, or a combination thereof; and
  determining, by the location analyzer, a correspondence between the current calling-party location and the one of the authorized or unauthorized locations.

4. The method of claim 1, wherein the determining of the current calling-party location comprises:
  determining, by the location analyzer, whether the call originated from one of a mobile device or a landline device;
  responsive to determining that the call originated from the mobile device:
    obtaining, by the location analyzer, geo-coordinates from the mobile device; and
    associating, by the location analyzer, the geo-coordinates with the current calling-party location according to one of an address or a map; and
  responsive to determining that the call originated from a landline device:
    accessing, by the location analyzer, a directory comprising associations between a plurality of addresses and a plurality of caller identifications;
    identifying, by the location analyzer, an address of the plurality of addresses corresponding to the identity of the calling party of the plurality of caller identifications; and
    determining, by the location analyzer, the current calling-party location from the address.

5. The method of claim 1, wherein the visual presentation comprises illumination of a color that indicates whether the current calling-party location complies with the location-dependent rule concerning the expected location, and wherein the current calling-party location comprises one of an address, a business identity, a cross-street, geo-coordinates, a neighborhood, a town, a city, a state, a country, a postal code, a geographic region, or any combination thereof, and
  wherein the expected location comprises a location within a user defined geographic region, a location without a user defined geographic location, a range from a reference location, a bearing from the reference location, a location associated with the calling-party schedule, or any combination thereof.

6. The method of claim 1, wherein the alert comprises an audible alert.

7. A device, comprising:
  a processing system including a processor; and
  a memory that stores executable instructions that, when executed by the processing system, facilitate performance of operations, comprising:
    receiving an incoming-call signal in response to equipment of a calling party placing a call from a calling-party location to equipment of a called party, wherein the incoming-call signal comprises a calling-party identification, wherein the calling-party identification includes a calling-party schedule, and wherein the equipment of the called party comprises a media processor that receives the incoming-call signal through a subscriber access network, and wherein the media processor is associated with a display;
    determining the calling-party identification associated with the equipment of the calling party based on the incoming-call signal;
    determining a current calling-party location of the equipment of the calling party based on the incoming-call signal;
    determining a location-dependent rule for the identity of the calling party and the current calling-party location;
    determining a current user of the media processor;
    determining a class of caller based on the calling-party identification and a relationship association with the current user of the media processor;
    determining an expected location for the calling party based on the calling party schedule and on a time that the incoming-call signal is received;
    determining whether the current calling-party location conflicts with the expected location;
    determining whether the class of caller includes an unexpected location alarm, wherein the unexpected location alarm indicates that the class of caller for the calling party is to be location monitored by the current user of the media processor;
    determining that the current calling-party location violates the location-dependent rule; and
    responsive to determining that the class of caller includes an unexpected location alarm and that the unexpected location alarm indicates that the class of caller for the calling party is to be location monitored by the current user of the media processor:
      generating a location indicator responsive to the calling-party identification and the current calling-party location, wherein the location indicator is presented to the display of the equipment of the called party, and wherein the indication comprises a visual presentation independent of the current calling-party location;
      indicating whether the current calling-party location violates the location-dependent rule responsive to determining that the current calling-party location violates the location-dependent rule; and
      providing an unexpected location alert responsive to determining the current calling-party location conflicts with the expected location.

8. The device of claim 7, wherein the visual presentation comprises illumination of a color that indicates whether the current calling-party location complies with the location-dependent rule, wherein the processor comprises a plurality of processors operating in a distributed processing environment, and wherein the operations further comprise:
  determining an image associated with the calling-party identification; and
  presenting the image to the display during an annunciation of the incoming-call signal.

9. The device of claim 7, wherein the determining that the current calling-party location violates the location-dependent rule further comprises:
  determining for the calling-party identification, one of an authorized location, an unauthorized location, or a combination thereof; and determining a correspondence between the current calling-party location and the one of the authorized or unauthorized locations.

10. The device of claim 7, wherein the determining of the current calling-party location comprises:
determining whether the call originated from one of a mobile device or a landline device;
responsive to determining that the call originated from the mobile device:
obtaining geo-coordinates from the mobile device; and
associating the geo-coordinates with the current calling-party location according to one of an address or a map; and
responsive to determining that the call originated from a landline device:
accessing a directory comprising associations between a plurality of addresses and a plurality of caller identifications;
identifying an address of the plurality of addresses corresponding to the calling-party identification of the plurality of caller identifications; and
determining the current calling-party location from the address.

11. The device of claim 7, wherein the current calling-party location comprises one of an address, a business identity, a cross-street, geo-coordinates, a neighborhood, a town, a city, a state, a country, a postal code, a geographic region, or any combination thereof, and wherein the operations further comprise presenting an audible alert that indicates whether the current calling-party location complies with the location-dependent rule.

12. The device of claim 7, wherein the current calling-party location is an approximation of a precise location of the equipment of the calling party when placing the call.

13. A non-transitory machine-readable storage medium, comprising instructions that, when executed by a processing system including a processor, facilitate performance of operations, comprising:
receiving a new call request in response to equipment of a calling party placing a call from a calling-party location to equipment of a called party, wherein the new call request comprises an identity of the equipment of the calling party, and wherein the equipment of the called party comprises a media processor associated with an interactive television network and a presentation device associated with the media processor;
determining an identity of the calling party based on the identity of the equipment of the calling party;
determining a location of the equipment of the calling party based on the calling party location;
determining a location-dependent rule for the identity of the calling party and the calling-party location;
determining a current user of the media processor;
determining a class of caller based on the identity of the calling party and a relationship association with the current user of the media processor;
determining an expected location for the calling party based on a calling party schedule and on a time that the new call request is received, wherein the calling party schedule is based on the identity of the calling party;
determining whether the calling-party location conflicts with the expected location;
determining whether the class of caller includes an unexpected location alarm, wherein the unexpected location alarm indicates that the class of caller for the calling party is to be location monitored by the current user of the media processor;
determining whether the calling-party location violates the location-dependent rule; and
responsive to determining that the class of caller includes an unexpected location alarm and that the unexpected location alarm indicates that the class of caller for the calling party is to be location monitored by the current user of the media processor:
generating a location indicator based on the identity of the calling party and the location of the equipment of the calling party, and according to the location-dependent rule, wherein the location indicator is presented to the presentation device of the equipment of the called party;
indicating whether the calling-party location violates the location-dependent rule responsive to determining that the calling-party location violates the location-dependent rule; and
providing an unexpected location alert and responsive to determining the calling-party location conflicts with the expected location.

14. The non-transitory machine-readable storage medium of claim 13, wherein the processor comprises a plurality of processors operating in a distributed processing environment, and wherein the operations further comprise:
determining an image associated with the identity of the calling party; and
presenting the image to the presentation device during an annunciation of the new call request.

15. The non-transitory machine-readable storage medium of claim 13, wherein the determining whether the calling-party location violates the location-dependent rule further comprises:
determining for the identity of the calling party, one of an authorized location, an unauthorized location, or a combination thereof; and
determining a correspondence between the location of the equipment of the calling party and the one of the authorized or unauthorized locations.

16. The non-transitory machine-readable storage medium of claim 13, wherein the determining of the location of the equipment of the calling party comprises:
determining whether the call originated from one of a mobile device or a landline device;
responsive to determining that the call originated from the mobile device:
obtaining the location from the mobile device; and
associating the location with one of an address or a map; and
responsive to determining that the call originated from a landline device:
accessing a directory comprising associations between a plurality of addresses and a plurality of caller identifications;
identifying an address of the plurality of addresses corresponding to the identity of the calling party of the plurality of caller identifications; and
determining the location of the equipment of the calling party from the address.

17. The non-transitory machine-readable storage medium of claim 13, wherein the unexpected location alert comprises illumination of light that indicates whether the location of the equipment of the calling party complies with the location-dependent rule, and wherein the location comprises one of an address, a business identity, a cross-street, geo-coordinates, a neighborhood, a town, a city, a state, a country, a postal code, a geographic region, or any combination thereof.

\* \* \* \* \*